(12) United States Patent
Beckmann et al.

(10) Patent No.: US 11,241,949 B2
(45) Date of Patent: Feb. 8, 2022

(54) HYDRAULIC MOUNT WITH NEGATIVE-PRESSURE VALVE

(71) Applicant: VIBRACOUSTIC GMBH, Darmstadt (DE)

(72) Inventors: Wolfgang Beckmann, Darmstadt (DE); Gamze Yildirim, Mannheim (DE)

(73) Assignee: Vibracoustic SE, Darmstadt (DE)

( * ) Notice: Subject to any disclaimer, the term of this patent is extended or adjusted under 35 U.S.C. 154(b) by 145 days.

(21) Appl. No.: 16/072,295

(22) PCT Filed: Jan. 23, 2017

(86) PCT No.: PCT/EP2017/051343
§ 371 (c)(1),
(2) Date: Jul. 24, 2018

(87) PCT Pub. No.: WO2017/129531
PCT Pub. Date: Aug. 3, 2017

(65) Prior Publication Data
US 2019/0168594 A1 Jun. 6, 2019

(30) Foreign Application Priority Data
Jan. 25, 2016 (DE) ...................... 10 2016 101 203.3

(51) Int. Cl.
*B60K 5/12* (2006.01)
*F16F 13/10* (2006.01)

(52) U.S. Cl.
CPC .......... *B60K 5/1208* (2013.01); *F16F 13/106* (2013.01); *F16F 2224/025* (2013.01)

(58) Field of Classification Search
CPC .. F16F 13/106; F16F 2224/025; B60K 5/1208
See application file for complete search history.

(56) References Cited

U.S. PATENT DOCUMENTS

| 4,850,578 A | 7/1989 | Katayama et al. |
| 8,807,545 B2 | 8/2014 | Masuda et al. |

(Continued)

FOREIGN PATENT DOCUMENTS

| DE | 112007002950 B4 | 5/2014 |
| DE | 112013002243 T5 | 3/2015 |

(Continued)

OTHER PUBLICATIONS

International Search Report PCT/EP2017/051343, dated Apr. 19, 2017.

(Continued)

*Primary Examiner* — Melody M Burch
(74) *Attorney, Agent, or Firm* — Fishman Stewart PLLC

(57) ABSTRACT

A hydromount suitable for mounting a motor vehicle engine on a vehicle body includes: a load-supporting spring that supports a mount core, encloses a working chamber, and is supported on an outer ring, an intermediate plate, and a compensation chamber separated from the working chamber by the intermediate plate and delimited by a compensation diaphragm. The compensation chamber and the working chamber are filled with a damping liquid and are connected with each other in a liquid-conducting manner via a damping channel disposed in the intermediate plate. The intermediate plate may include an upper nozzle disk, a lower nozzle disk, and a diaphragm disposed between the upper nozzle disk and the lower nozzle disk. The diaphragm may have an inner circumference, an outer circumference, and at least one valve opening. The at least one valve opening may be disposed completely between the inner circumference and the outer circumference.

10 Claims, 3 Drawing Sheets

(56) References Cited

U.S. PATENT DOCUMENTS

| | | | |
|---|---|---|---|
| 8,864,114 B2 | 10/2014 | Masuda et al. | |
| 10,589,615 B2* | 3/2020 | Chern | B60K 5/04 |
| 2004/0239021 A1* | 12/2004 | Itoh | F16F 13/106 |
| | | | 267/140.13 |
| 2011/0210488 A1* | 9/2011 | Yamamoto | F16F 13/106 |
| | | | 267/140.13 |
| 2012/0018935 A1* | 1/2012 | Ogasawara | F16F 13/106 |
| | | | 267/140.13 |
| 2012/0074629 A1 | 3/2012 | Yamamoto et al. | |
| 2012/0228813 A1 | 9/2012 | Masuda et al. | |
| 2012/0248669 A1* | 10/2012 | Masuda | F16F 13/106 |
| | | | 267/140.13 |
| 2012/0292838 A1 | 11/2012 | Yamamoto et al. | |
| 2014/0175719 A1* | 6/2014 | Kanaya | F16F 13/106 |
| | | | 267/140.13 |

FOREIGN PATENT DOCUMENTS

| | | |
|---|---|---|
| DE | 102014108840 A1 | 12/2015 |
| EP | 2960543 A1 | 12/2015 |
| JP | H02-26336 A | 1/1990 |
| JP | 2012-189166 A | 10/2012 |
| JP | 2012-215214 A | 11/2012 |
| JP | 2013-228004 A | 11/2013 |
| JP | 2015-102168 A | 6/2015 |

OTHER PUBLICATIONS

English abstract for JP2013-228004A.
English abstract for JP2015-102168A.
Korean Office Action, 10-2018-7021042, dated Jul. 22, 2020.
Translation of European Office Action, 17701841.3, dated May 20, 2021.

* cited by examiner

HYDRAULIC MOUNT WITH NEGATIVE-PRESSURE VALVE

CROSS-REFERENCE TO RELATED APPLICATION

This application is a National Stage Patent Application of International Patent Application No. PCT/EP2017/051343, filed Jan. 23, 2017, which claims the benefit of German Application Serial No. 10 2016 101 203.3, filed Jan. 25, 2016, the contents of each are incorporated by reference in their entireties.

TECHNICAL FIELD

The invention relates to a hydromount suitable for mounting a motor vehicle engine on a vehicle body.

BACKGROUND

Hydraulic damping mounts are used, in particular, for supporting a motor vehicle engine on a vehicle body in order to, on the one hand, dampen the vibrations caused by road bumps and, on the other hand, to provide insulation against acoustic vibrations. The vibrations caused by road bumps are dampened by a hydraulic system, with the hydraulic system being formed by the liquid-dampened working chamber, the compensation chamber, and the damping channel connecting the two chambers with each other. The mode of operation of the hydraulic system can be described as follows: The working chamber is made larger or smaller by a movement of the load-supporting spring, with the liquid located in the working chamber being pressed via the damping channel into the compensation chamber. The liquid oscillating in the damping channel causes a damping action. In the event of negative pressure in the working chamber relative to the compensation chamber, the liquid flows back from the compensation chamber into the working chamber.

A vibration-isolating device with a separating member is known from DE 11 2013 002 243 T5. The separating member includes a diaphragm having an overpressure valve in a central section. The central section with the overpressure valve is configured to be thinner than the main body of the diaphragm, and has an overpressure hole in its center.

It is an object of the present invention to improve devices of the known type with respect to the development of unwanted noise at large amplitudes.

This object is achieved by means of a hydromount according to the present disclosure. Advantageous embodiments of the invention are the subject matter of the dependent claims.

SUMMARY

A hydromount for mounting a motor vehicle engine on a vehicle body includes: a load-supporting spring that supports a mount core, encloses a working chamber, and is supported on an outer ring, an intermediate plate, and a compensation chamber which is separated from the working chamber by the intermediate plate and is delimited by a compensation diaphragm. The compensation chamber and the working chamber may be filled with a damping liquid and may be connected with each other in a liquid-conducting manner via a damping channel disposed in the intermediate plate. The intermediate plate may have an upper nozzle disk, a lower nozzle disk and a diaphragm disposed between the upper nozzle disk and the lower nozzle disk. The diaphragm may have an inner circumference, an outer circumference and at least one valve opening. In a device according to the invention, the diaphragm may have at least one valve opening which is disposed completely between the inner circumference and the outer circumference. The valve opening may be completely delimited by the diaphragm material.

The diaphragm can be placed in the lower nozzle disk in such a way that the at least one valve opening rests on the material of the lower nozzle disk. In this configuration, the intermediate plate, together with the diaphragm and the nozzle disks, constitutes a unidirectional valve. In the event of an overpressure in the working chamber relative to the compensation chamber, the diaphragm is pressed onto the lower nozzle disk. In that case, damping liquid flows from the working chamber into the compensation chamber only through the damping channel.

In the event of a negative pressure in the working chamber relative to the compensation chamber, however, a suction effect acts on the diaphragm, which makes the latter bulge towards the upper nozzle disk. Thus, a channel is formed between the diaphragm and the lower nozzle disk. In that case, the damping liquid is able to flow back from the compensation chamber into the working chamber through the nozzle assembly of the lower nozzle disk, the valve opening of the diaphragm, and the nozzle assembly of the upper nozzle disk. Thus, the formation of large overpressures in the working chamber is avoided. Comparatively, very large volumes of damping liquid can be conducted at great amplitudes through the valve opening, which is large compared to known intermediate plates. Thus, the occurrence of cavitation and unwanted noise connected therewith is noticeably reduced.

Advantageously, the lower nozzle disk has an accommodating portion for accommodating the diaphragm, which comprises a nozzle assembly and a material portion. Thus, the diaphragm can be accommodated in the accommodating portion and is secured against radial slipping at the lower nozzle disk.

Advantageously, the material portion has at least one projection configured to engage with the valve opening of the diaphragm. Thus, the diaphragm is also secured against rotating in the accommodating portion and fixed in its position in the accommodating portion.

Advantageously, the lower nozzle disk has at least one centering pin and the upper nozzle disk has at least one centering opening, wherein the at least one centering pin is configured to be inserted into the at least one centering opening. Thus, the lower nozzle disk and the upper nozzle disk can be connected to one another and secured against slipping or rotating.

Advantageously, the valve opening is formed as an elongated hole. Such a configuration additionally enables passing through large volumes and thus improves the valve behavior at large amplitudes.

Advantageously, the longitudinal axis of the valve opening is offset relative to the radial direction.

Advantageously, the diaphragm is fixed with axial clearance between the upper nozzle disk and the lower nozzle disk, whereby the diaphragm is able to lift or bulge more easily.

Advantageously, the diaphragm is made from an elastic material.

Advantageously, the diaphragm has a surface structure, wherein the surface structure is preferably formed in a nubbed manner.

BRIEF DESCRIPTION OF THE DRAWINGS

The invention is explained below in more detail with reference to an exemplary embodiment that is schematically depicted in the drawings. In the drawings.

DETAILED DESCRIPTION

Figure 1:
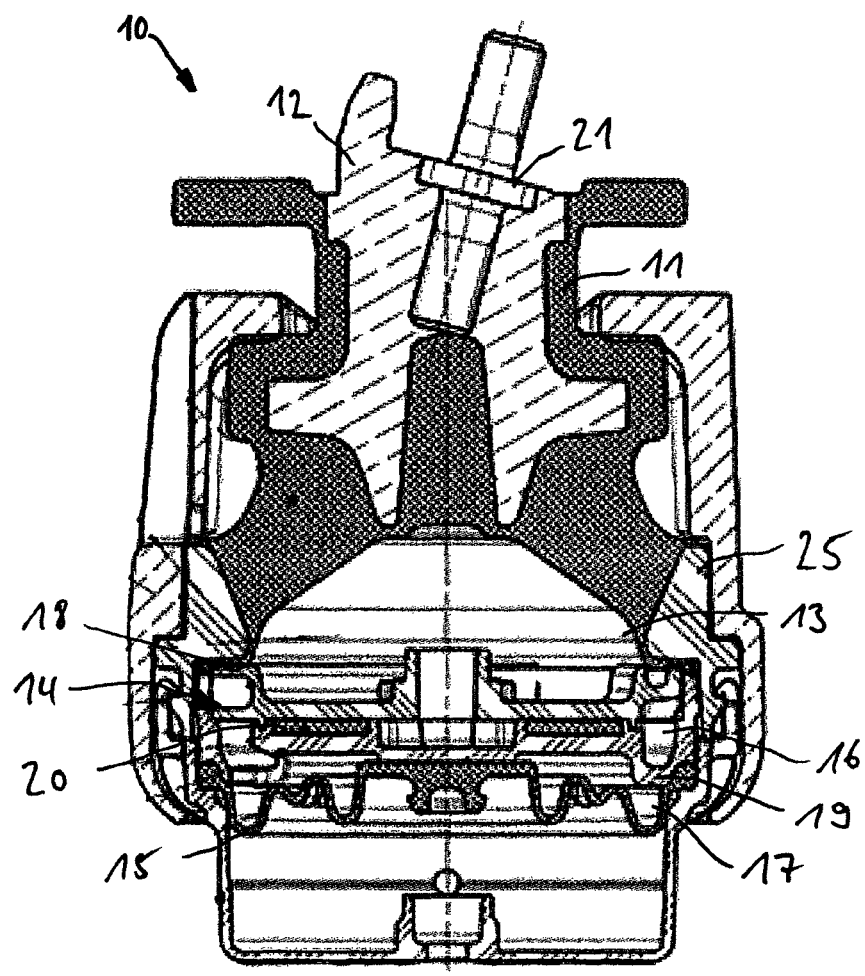
FIG. 1 shows a cross-sectional view of a hydromount with an intermediate plate.

FIG. 1 illustrates a hydromount 10 for mounting a motor vehicle engine that is not shown on a vehicle body that is not shown. The hydromount 10 has a load-supporting spring 11 consisting of an elastomeric material for supporting a mount core 12 incorporated by vulcanization. The engine (not shown) is attached to the mount core 12. A screw coupling 21 is embedded into the mount core 12.

The load-supporting spring 11 is supported on an outer ring 25 and delimits a working chamber 13, which is separated from a compensation chamber 17 by means of an intermediate plate 14. The compensation chamber 17 is delimited by a compensation diaphragm 15, which is also referred to as a roller bellows. The chambers 13 and 17 are filled with a hydraulic liquid and connected to each other in a liquid-conducting manner via a damping channel 16 disposed in the intermediate plate 14.

The intermediate plate 14 has an upper nozzle disk 18 and a lower nozzle disk 19. The upper nozzle disk 18 and the lower nozzle disk 19 are made from plastic. A diaphragm 20 is accommodated between the upper nozzle disk 18 and the lower nozzle disk 19.

Figure 2:
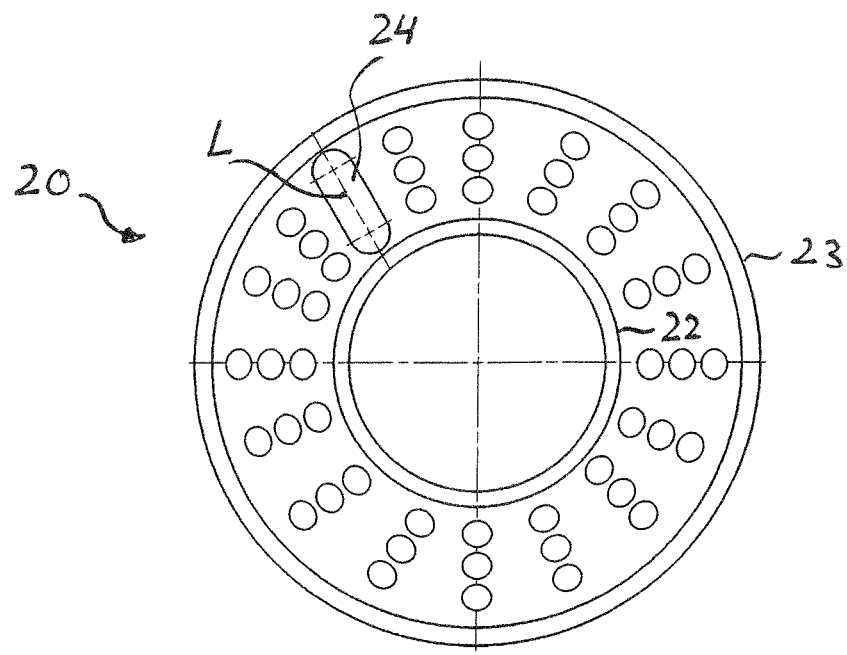
FIG. 2 shows a plan view of a diaphragm of an intermediate plate.

FIG. 2 shows a plan view of a diaphragm 20 of a hydromount 10 according to the invention. In the present example, the diaphragm 20 is configured to be annular and has an inner circumference 22 and an outer circumference 23. Further, the diaphragm 20 has a valve opening 24, which is disposed completely between the inner circumference 22 and the outer circumference 23. Thus, the valve opening is completely delimited by the material of the diaphragm 20.

In the present example, the valve opening 24 is formed in the shape of an elongated hole. The longitudinal axis L of the valve opening 24 is offset relative to the radial direction of the diaphragm 20, i.e. the extension of the longitudinal axis L does not pass through the center of the diaphragm 20.

The diaphragm 20 is made from an elastic material and has a nubbed surface structure (not shown).

Figure 3:
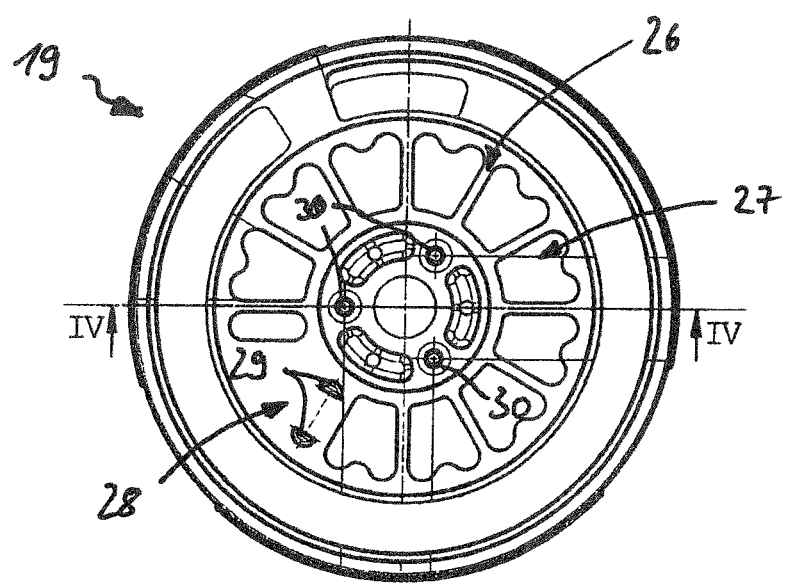
FIG. 3 shows a plan view of a lower nozzle disk.
Figure 4:
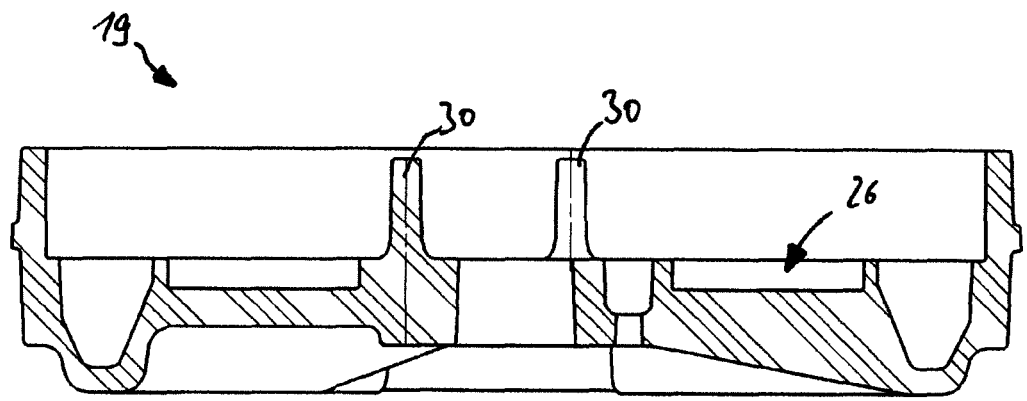
FIG. 4 shows a cross-sectional view of the lower nozzle disk along the cut line from FIG. 3.

FIG. 3 shows a plan view of a lower nozzle disk 19. FIG. 4 shows a cross-sectional view of the lower nozzle disk 19 along the cut line from FIG. 3. The lower nozzle disk 19 has an accommodating portion 26 for accommodating the diaphragm 20. In the present example, the accommodating portion 26 is configured as an annular depression in the lower nozzle disk 19. Thus, the accommodating portion 26 is configured in such a way that the annular diaphragm 20 from FIG. 2 can be accommodated therein.

The accommodating portion 26 has a nozzle assembly 27 and a material portion 28. The nozzle assembly 27 is formed by several cutouts that follow one another along the annular accommodating portion 26. In the mounted state, the nozzle assembly 27 forms a passageway to the compensation chamber 17.

The accommodating portion 26 has no cutouts on the material portion 28. The former is closed off in a downward direction by the material of the lower nozzle disk 19. The material portion 28 has two projections 29. The projections 29 are formed in such a way that they can engage with the valve opening 24 of the diaphragm 20. Accordingly, the intermediate plate 14 must be installed in such a way that the diaphragm 20 is to be placed in the accommodating portion 26 of the lower nozzle disk 19 such that the projections 29 precisely engage into the valve opening 24.

Furthermore, the lower nozzle disk 19, at the side thereof facing towards the working chamber 13, has three centering pins 30. In the present example, the centering pins 30 are uniformly arranged along a circular path drawn about the center of the lower nozzle disk 19, i.e. respectively offset by 120°.

Figure 5:
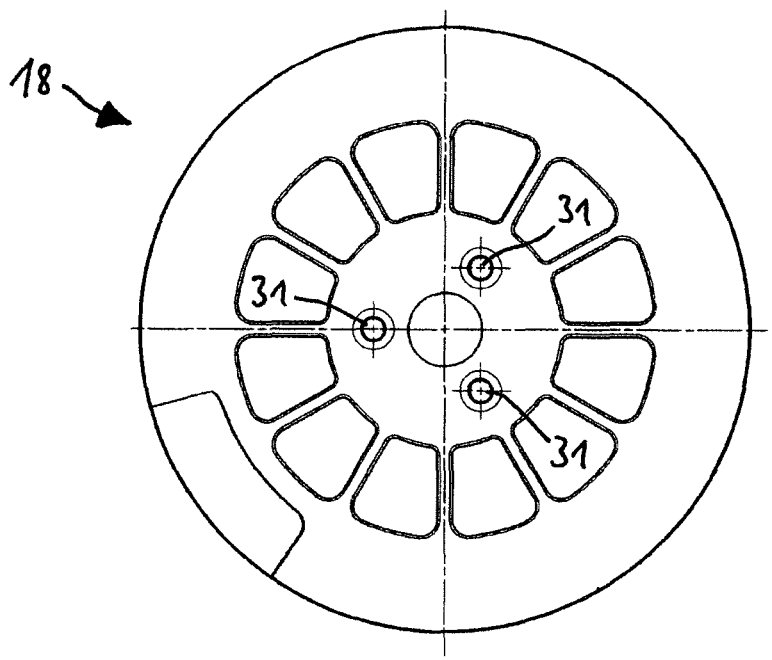
FIG. 5 shows a plan view of an upper nozzle disk.

FIG. 5 shows an upper nozzle disk 18 according to the invention. In the present example, the upper nozzle disk 18 has three centering openings 31 configured and disposed in such a manner that the three centering pins 30 of the lower nozzle disk 19 can be inserted into them. Thus, the lower nozzle disk 19 accommodates the upper nozzle disk 18. Then, the diaphragm 20 is accommodated between the lower nozzle disk 19 and the upper nozzle disk 18. Furthermore, the upper nozzle disk 18 has a nozzle assembly which, in the mounted state, forms a passageway to the working chamber 13.

When the intermediate plate 14 consisting of the lower nozzle disk 19, the upper nozzle disk 18 and the diaphragm 20 is installed in the hydromount 10, it separates the working chamber 13 from the compensation chamber 17. The diaphragm 20 is in that case placed in the lower nozzle disk 19 in such a way that the valve opening 24 rests on the material of the lower nozzle disk 19. In this configuration, the intermediate plate 14 constitutes a unidirectional valve. In the event of an overpressure in the working chamber 13 relative to the compensation chamber 17, the diaphragm 20 is pressed onto the lower nozzle disk 19. In that case, damping liquid flows through the damping channel 16 from the working chamber 13 into the compensation chamber 17.

In the event of a negative pressure in the working chamber 13 relative to the compensation chamber 17, the negative pressure acts via the nozzle assembly of the upper nozzle disk 18 on the diaphragm 20, so that the latter is lifted up and made to bulge. Thus, the channel for the damping liquid to flow back through is formed between the diaphragm 20 and the lower nozzle disk 19. In that case, the damping liquid is able to flow back from the compensation chamber 17 into the working chamber 13 through the nozzle assembly of the lower nozzle disk 19, the valve opening 24 of the diaphragm 20, and the nozzle assembly of the upper nozzle disk 18.

LIST OF REFERENCE NUMERALS

10 Hydromount
11 Load-supporting spring
12 Mount core
13 Working chamber
14 Intermediate plate
15 Compensation diaphragm
16 Damping channel
17 Compensation chamber
18 Upper nozzle disk
19 Lower nozzle disk
20 Diaphragm
21 Screw coupling
22 Inner circumference
23 Outer circumference
24 Valve opening
25 Outer ring
26 Accommodating portion
27 Nozzle assembly 28 Material portion
29 Projection
30 Centering pin
31 Centering opening
L Longitudinal axis

The invention claimed is:

1. A hydromount for mounting a motor vehicle engine on a vehicle body, comprising:
    a load-supporting spring that supports a mount core, encloses a working chamber, and is supported on an outer ring;
    an intermediate plate; and
    a compensation chamber which is separated from the working chamber by the intermediate plate and is delimited by a compensation diaphragm,
    wherein the compensation chamber and the working chamber are filled with a damping liquid and are connected with each other in a liquid-conducting manner via a damping channel disposed in the intermediate plate; the intermediate plate has an upper nozzle disk, a lower nozzle disk, and an intermediate diaphragm disposed between the upper nozzle disk and the lower nozzle disk and provides an axial clearance; the intermediate diaphragm has an inner circumference, an outer circumference, and at least one valve opening; the at least one valve opening is disposed completely between the inner circumference and the outer circumference; the intermediate diaphragm is configured to lift and bulge in the event of a negative pressure in the working chamber; the inner circumference defines a through hole; and the lower nozzle disk, at a side facing towards the working chamber, has at least one centering pin reaching through the through hole;
    wherein the lower nozzle disk has an accommodating portion for accommodating the intermediate diaphragm that comprises a nozzle assembly and a material portion, the nozzle assembly being formed by a plurality of cutouts that follow one another along the accommodating portion, and the upper nozzle disk has a nozzle assembly forming a passageway to the compensation chamber; wherein when the intermediate plate is installed in the hydromount, the intermediate plate separates the working chamber from the compensation chamber, the intermediate diaphragm is placed in the lower nozzle disk in such a way that the valve opening rests on the material of the lower nozzle disk, and the intermediate plate constitutes a unidirectional valve;
    wherein in the event of an overpressure in the working chamber relative to the compensation chamber, the intermediate diaphragm is pressed onto the lower nozzle disk and the damping liquid flows through the damping channel from the working chamber into the compensation chamber; and
    wherein in the event of a negative pressure in the working chamber relative to the compensation chamber, the negative pressure acts via the nozzle assembly of the upper nozzle disk on the intermediate diaphragm so that the intermediate diaphragm is lifted up and made to bulge, the damping channel being formed between the intermediate diaphragm and the lower nozzle disk, the damping liquid being able to flow back from the compensation chamber into the working chamber through the nozzle assembly of the lower nozzle disk, the valve opening of the intermediate diaphragm, and the nozzle assembly of the upper nozzle disk.

2. The hydromount according to claim 1, wherein the material portion has at least one projection configured to engage with the valve opening of the intermediate diaphragm.

3. The hydromount according to claim 1, wherein the upper nozzle disk has at least one centering opening, and the at least one centering pin is configured to be inserted into the at least one centering opening.

4. The hydromount according to claim 1, wherein the valve opening is formed as an elongated hole.

5. The hydromount according to claim 1, wherein a longitudinal axis of the valve opening is offset relative to a radial direction of the intermediate diaphragm.

6. The hydromount according to claim 1, wherein the intermediate diaphragm is fixed between the upper nozzle disk and the lower nozzle disk to provide the axial clearance.

7. The hydromount according to claim 1, wherein the intermediate diaphragm is made from an elastic material.

8. The hydromount according to claim 1, wherein the intermediate diaphragm has a surface structure.

9. The hydromount according to claim 1, wherein the at least one centering pin includes a plurality of centering pins equally spaced in a circumferential direction.

10. The hydromount according to claim 1, wherein the intermediate diaphragm has a planar configuration.

* * * * *